US011965487B2

(12) United States Patent
Spandley et al.

(10) Patent No.: US 11,965,487 B2
(45) Date of Patent: Apr. 23, 2024

(54) ELECTRO-THERMAL HEATING ELEMENTS

(71) Applicant: VESTAS WIND SYSTEMS A/S, Aarhus N (DK)

(72) Inventors: Luke Spandley, Ventnor (GB); Arran Wood, Cowes (GB); Darren Rogers, Newport (GB)

(73) Assignee: VESTAS WIND SYSTEMS A/S, Aarhus N (DK)

( * ) Notice: Subject to any disclaimer, the term of this patent is extended or adjusted under 35 U.S.C. 154(b) by 1060 days.

(21) Appl. No.: 16/627,433

(22) PCT Filed: Jun. 15, 2018

(86) PCT No.: PCT/DK2018/050144
§ 371 (c)(1),
(2) Date: Dec. 30, 2019

(87) PCT Pub. No.: WO2019/001657
PCT Pub. Date: Jan. 3, 2019

(65) Prior Publication Data
US 2020/0149513 A1 May 14, 2020

(30) Foreign Application Priority Data
Jun. 30, 2017 (DK) .............................. PA201770520

(51) Int. Cl.
F03D 80/40 (2016.01)
F03D 1/06 (2006.01)
(Continued)

(52) U.S. Cl.
CPC ............ F03D 80/40 (2016.05); F03D 1/0675 (2013.01); F03D 80/60 (2016.05); H05B 3/00 (2013.01);
(Continued)

(58) Field of Classification Search
CPC ........ F03D 80/40; F03D 80/60; F03D 1/0675; H05B 3/00; H05B 3/0023; H05B 3/18; H05B 2203/00; H05B 2214/02
See application file for complete search history.

(56) References Cited

U.S. PATENT DOCUMENTS 3,287,684 A    11/1966  Armbruster
2008/0099617 A1  5/2008  Gilmore et al.
(Continued)

FOREIGN PATENT DOCUMENTS

CN    102971136 A    3/2013
CN    103227440 A    7/2013
(Continued)

OTHER PUBLICATIONS

Chinese Office Action for Application No. 201880044011.6 dated Sep. 3, 2020.
(Continued)

Primary Examiner — Nathaniel E Wiehe
Assistant Examiner — Keith Brian Assante
(74) Attorney, Agent, or Firm — Patterson + Sheridan, LLP

(57) ABSTRACT

The present invention relates to an Electro-Thermal Heating element for a wind turbine blade comprising an electrically conductive resistive material; two active busbars for supplying electrical power to the electrically conductive resistive material; and at least one dummy busbar at a predetermined spacing between the two active busbars on the electrically conductive resistive material. The present invention is also directed to a method of repair of the Electro-Thermal Heating Element.

20 Claims, 4 Drawing Sheets

(51) Int. Cl.
  *F03D 80/60* (2016.01)
  *H05B 3/00* (2006.01)
  *H05B 3/18* (2006.01)
(52) U.S. Cl.
  CPC ............ *H05B 3/0023* (2013.01); *H05B 3/18* (2013.01); *H05B 2203/00* (2013.01); *H05B 2214/02* (2013.01)

(56) References Cited

U.S. PATENT DOCUMENTS

| | | | | |
|---|---|---|---|---|
| 2011/0290786 | A1* | 12/2011 | Hu | B64D 15/12 219/544 |
| 2015/0204311 | A1 | 7/2015 | Clemens | |
| 2015/0283653 | A1* | 10/2015 | Krueger | F03D 80/50 29/611 |
| 2017/0122295 | A1 | 5/2017 | Klein | |

FOREIGN PATENT DOCUMENTS

| | | | | |
|---|---|---|---|---|
| CN | 103392067 | A | | 11/2013 |
| CN | 104520582 | A | * | 4/2015 ............ F01D 5/147 |
| CN | 104520582 | A | | 4/2015 |
| CN | 106762392 | A | | 5/2017 |
| DK | 2843228 | T3 | | 7/2016 |
| EP | 165761 | A2 | | 12/1985 |
| EP | 2868575 | A1 | | 5/2015 |
| EP | 2926984 | A1 | | 10/2015 |
| EP | 3091816 | A1 | | 11/2016 |
| WO | 2016036576 | A1 | | 3/2016 |
| WO | 2019001657 | A1 | | 1/2019 |

OTHER PUBLICATIONS

European Patent Office, Communication Pursuant to Article 94(3) EPC for Application 18 734 428.8-1002 dated Aug. 25, 2022.
European Patent Office Examination for Appliction 18734428.8 dated Jul. 5, 2021.
Danish Patent and Trademark Office Search Report for PA 2017 70520 dated Dec. 19, 2017.
PCT Written Opinion of the International Searching Authority for PCT/DK2018/050144.
PCT International Search Report for PCT/DK2018/050144 dated Sep. 17, 2018.
European Patent Office, Communication Pursuant to Article 94(3) EPC for Application 18 734 428.8-1002 dated Dec. 17, 2024.
Canadian Intellectual Property Office, Requisition by the Examiner and Examination Search Report for Application 3,066,694 dated Feb. 2, 2024 (Feb. 2, 2024), 3 pages.

* cited by examiner

ELECTRO-THERMAL HEATING ELEMENTS

The present invention is directed to Electro-Thermal Heating (ETH) Elements and, in particular, to the repair of Electro-Thermal Heating Elements.

BACKGROUND

Wind turbines generate electrical power from wind energy and can be situated on land or off-shore. Wind turbines situated in cold climates can suffer from icing events where ice may be formed on the surface of the wind turbine blades due to freezing water on the cold surface. The accumulation of ice on the surface of a blade can result in undesirable consequences. For example, a change in the profile of the wind turbine blades due to the accumulation of ice may reduce the speed of rotation of the wind turbine. As a result, the wind turbine may operate below optimal efficiency which degrades the performance of the wind turbine. Also, the additional weight of the accumulating ice on the wind turbine blades may cause fatigue and stress failures of the blades.

Therefore, there is a need to be able to prevent or reduce the effects of icing on the blades of a wind turbine in order to prevent damage to the blades and also to increase the performance of a wind turbine.

Various systems and methods have been described to either, or both, to de-ice (e.g. remove ice accumulated) a wind turbine or to provide anti-icing (e.g. prevent ice from accumulating) for a wind turbine.

For example, it is known to attach ETH elements to the wind turbine blades which, when supplied with electrical power, generate heat to increase the surface temperature of the surface of the blade. Such ETH elements may be used for either or both of anti-icing or de-icing of the wind turbine blade.

However, if the blade surface or structure is damaged which subsequently causes damage to the embedded ETH element then it is difficult to make a repair to the embedded ETH element without further damaging the ETH element or having to replace the entire ETH element within the blade structure.

The present invention seeks to address, at least in part, the problems and disadvantages described hereinabove and to seek to provide an improved method of repair of an ETH element embedded in a wind turbine blade and an improved ETH element.

SUMMARY OF THE INVENTION

According to a first aspect of the present invention there is provided an Electro-Thermal Heating element for a wind turbine blade comprising: an electrically conductive resistive material; two active busbars for supplying electrical power to the electrically conductive resistive material; and at least one dummy busbar at a predetermined spacing between the two active busbars on the electrically conductive resistive material.

The present invention advantageously provides an Electro-Thermal Heating (ETH) element with dummy busbars at predetermined spacings so that a repair of the ETH element can be achieved in a more effective manner.

The Electro-Thermal Heating element may further comprise a new section of electrically conductive resistive material connected to a first dummy busbar and a further busbar, wherein the new section of electrically conductive resistive material replaces a damaged section of electrically conductive resistive material that is removed from the Electro-Thermal Heating element. The further busbar may be a second dummy busbar or one of the two active busbars.

The Electro-Thermal Heating element may further comprise at least one new busbar attached to one or both of the first dummy busbar and the further busbar. According to a second aspect of the present invention there is provided a method of repairing an Electro-Thermal Heating element; the Electro-Thermal Heating element being embedded in laminate layers of a wind turbine blade structure and the method comprising: an electrically conductive resistive material; two active busbars for supplying electrical power to the electrically conductive resistive material; and at least one dummy busbar at a predetermined spacing on the electrically conductive resistive material between the two active busbars; the method of repairing the Electro-Thermal Heating element comprising: determining a location of damage to a section of electrically conductive resistive material; determining a position of a first dummy busbar and a further busbar adjacent to the location of the damaged section of electrically conductive resistive material; removing the laminate layers of the blade structure at the location of the damaged section of electrically conductive resistive material between the adjacent busbars; removing the damaged section of electrically conductive resistive material; attaching a new section of electrically conductive resistive material wherein the new section of electrically conductive resistive material makes electrical contact with the adjacent busbars; and replacing the laminate layers of the blade structure over the new section of electrically conductive resistive material.

The further busbar may be a second dummy busbar or one of the two active busbars.

The method may further comprise attaching at least one new busbar to one or both of the first dummy busbar and the further busbar.

Attaching or connecting the new section of ETH element and/or new busbars may be via one or more of adhesive, stitching, and staples.

DRAWINGS

Embodiments of the present invention will now be described, by way of example only, and with reference to the accompanying drawings, in which.

EMBODIMENTS

Figure 1:
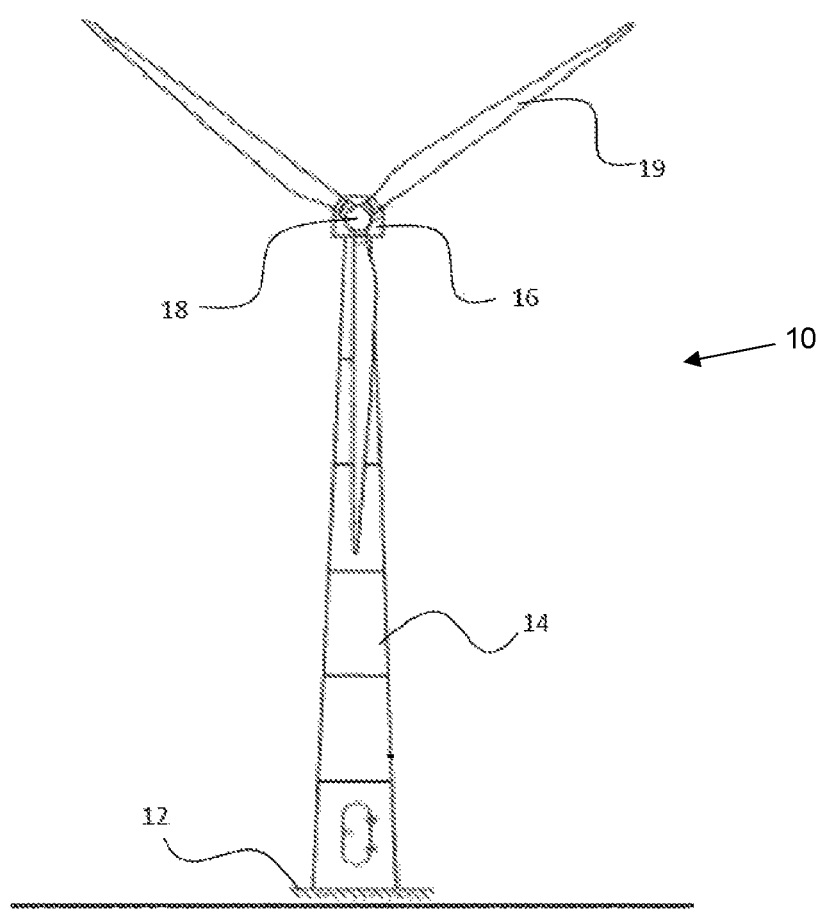
FIG. 1 shows a schematic of a wind turbine according to one or more of the embodiments of the present invention.

FIG. 1 shows a schematic of a typical wind turbine 10 which includes embodiments of wind turbine blades 19 according to the present invention. The wind turbine 10 is mounted on a base 12 which may be onshore foundations or off-shore platforms or foundations. The wind turbine includes a tower 14 having a number of tower sections. A nacelle 16 is located and attached to the top of tower 14. A wind turbine rotor, connected to the nacelle 16, includes a hub 18 and at least one wind turbine blade 19, where in FIG. 1 three wind turbine blades are shown although any number of wind turbine blades 19 may be present depending on the design and implementation of the wind turbine 10. The wind turbine blades 19 are connected to the hub 18 which in turn is connected to the nacelle 16 through a low speed shaft which extends out of the front of the nacelle 16.

Figure 2:
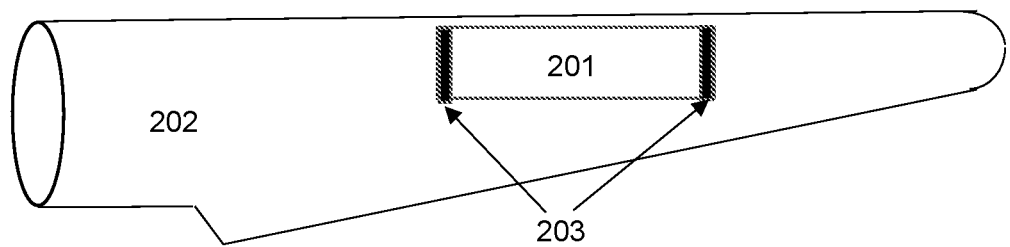
FIG. 2 shows a schematic of an Electro-Thermal Heating Element in a wind turbine blade according to one or more of the embodiments of the present invention.

With reference to FIG. 2, Electro-Thermal Heating (ETH) elements 201 may be embedded within the blade 202 structure between laminate layers of the blade structure and are therefore contained within the blade 202. If the ETH element 201 suffers damage then it is very difficult to access the ETH element 201 within the blade 202 in order to replace or repair the ETH element 201.

The ETH elements 201 are typically formed from a lightweight layer of conductive material, for example, between 3 grams per meter squared to 50 grams per meter squared, with two busbars 203 positioned at opposite sides or ends of the ETH element 201, to provide the connection for the supply of electrical power. The busbars may be positioned in the blade chordwise or spanwise directions on the ETH elements.

Conventionally, if the laminate layers of the blade are damaged and require a repair then the standard repair procedure would be to grind away the laminate layers that are damaged, or to grind down to the damaged area, and the damaged laminate layers replaced with new materials.

However, as mentioned hereinabove, the ETH elements are formed of a lightweight layer of conductive material and so the standard blade repair procedure would not be suitable as it would be difficult to accurately grind down to the ETH element layer without further damaging the ETH element. Furthermore, even if one could accurately and carefully grind down to the damaged section of ETH element then by simply replacing the damaged area with a new section of ETH element would provide a poor electrical connection between the existing ETH element and the new ETH element replacement section.

One strategy to repair the ETH element could be to remove the entire ETH element which has a damaged section. This would require grinding away and removing the blade laminate layers and the ETH element layer between the two busbars that connect the ETH element to the power supply. If the entire ETH element was removed between the two busbars then the new replacement ETH element section would have a good electrical connection to the busbars. However, this strategy has the disadvantage that the entire ETH element has to be removed which requires a large amount of grinding as ETH elements may be several meters in length and/or width.

A further strategy to repair the ETH element according to one or more of the embodiments of the present invention will now be described with reference to FIG. 3.

An ETH element 301 comprises at least one additional "dummy" busbar 302 positioned between two active busbars 303 on the ETH element 301. A dummy busbar 302 is an extra busbar that serves no real purpose during the normal operation of the ETH element 301 but can be utilized if the ETH element 301 is damaged and needs repairing. In contrast, the active busbars 303 provide the connection to the power supply and are always in use during the operation of the ETH element 301.

Figure 3:
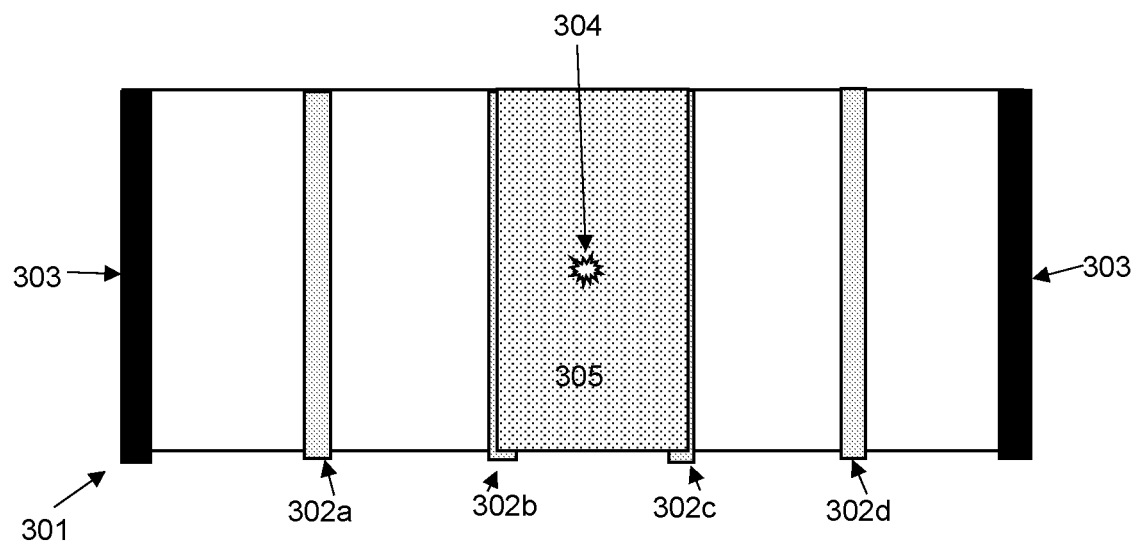
FIG. 3 shows a schematic of an Electro-Thermal Heating Element and a repair according to one or more of the embodiments of the present invention.

In FIG. 3, there are four extra dummy busbars 302a to 302d positioned between the two active busbars 303. Each of the dummy busbars 302a to 302d is positioned at predetermined locations on the ETH element 301. For example, the dummy busbars 302a to 302d may be spaced every 500 millimeters (mm), 1000 mm, or any other suitable predetermined spacing on the ETH element 301 between the active busbars 303.

As will be appreciated, there may be any number of dummy busbars 302 at any suitable predetermined spacing or position on the ETH element 301 for the purpose of the present invention.

As shown in FIG. 3, an area of damage 304 has occurred to the ETH element 301 towards the centre of the ETH element 301 and the area of damage is located between two dummy busbars 302b and 302c. In this example, the repair of the damaged area 304 comprises grinding away the blade surface that corresponds to an area between the two dummy busbars 302b, 302c that are adjacent to, or either side of, the damaged area of ETH element 301. The ETH element 301 is then removed between the adjacent dummy busbars 302b, 302c and replaced with a new section of ETH element 305. The new section of ETH element 305 is connected to the two adjacent dummy busbars 302b, 302c so that the new section of ETH element 305 is operable to generate heat once the ETH element 301 is activated.

Figure 4:
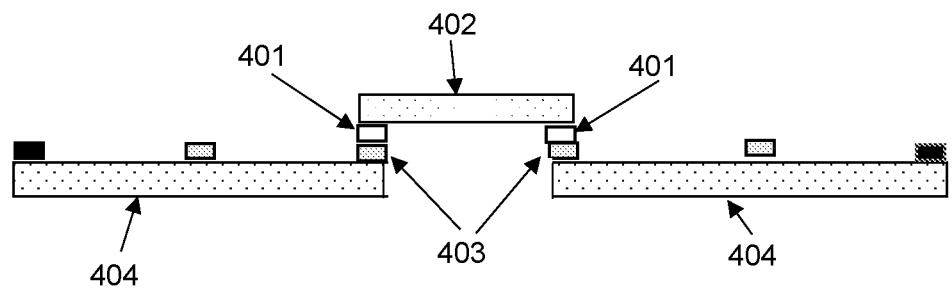
FIG. 4 shows a schematic of a new section of Electro-Thermal Heating Element being attached to new busbars according to one or more of the embodiments of the present invention.

Alternatively, or additionally, and with reference to FIG. 4, one or more new busbars 401 may be attached to the new section of ETH element 402 where the new busbars 401 are also attached to the existing busbars 403. The one or more new busbars 401 may be attached to ensure a good electrical connection between the new section of ETH element 402 and the existing ETH element 404. A new busbar 401 may be required in situations where the existing busbars 403 were damaged during the process of grinding through the blade laminate layers, the existing busbar 403 has not been completely exposed, and/or any resin on the existing busbars 403 has not been completely removed.

Figure 5:
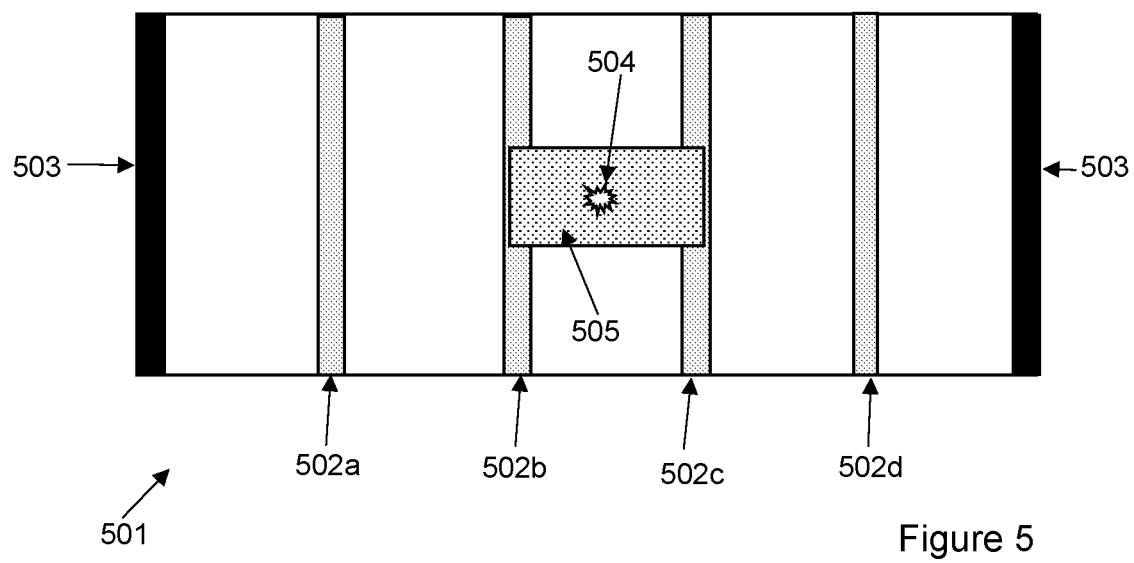
FIG. 5 shows a schematic of an Electro-Thermal Heating Element and a repair according to one or more of the embodiments of the present invention.

A more localized repair strategy is shown in FIG. 5 where, as with FIG. 3, there are four dummy busbars 502a to 502d positioned on the ETH element 501 at predetermined spacings between the two active busbars 503.

In this example, instead of removing the entire section of ETH element 501 between the two adjacent dummy busbars 502b, 502c to the damaged area 504 of the ETH element 501, a more localized section or area of the damaged ETH element is removed.

A new section of ETH element 505 is then laid to replace the removed damaged section and is connected to the dummy busbars.

As with the example given with reference to FIG. 4, new busbars may be attached to the new section of ETH element where the new busbars are also attached to the existing dummy busbars.

In the above example, the damaged area of ETH element was between two dummy busbars. However, as will be appreciated, the damaged section of ETH element may occur between a dummy busbar and an active busbar towards either end of the ETH element. In this case, the same process of repairing the ETH element can be performed according to the examples of FIGS. 3 to 5, with the adjacent busbars to the damaged area being one active busbar and one dummy busbar.

Figure 6:
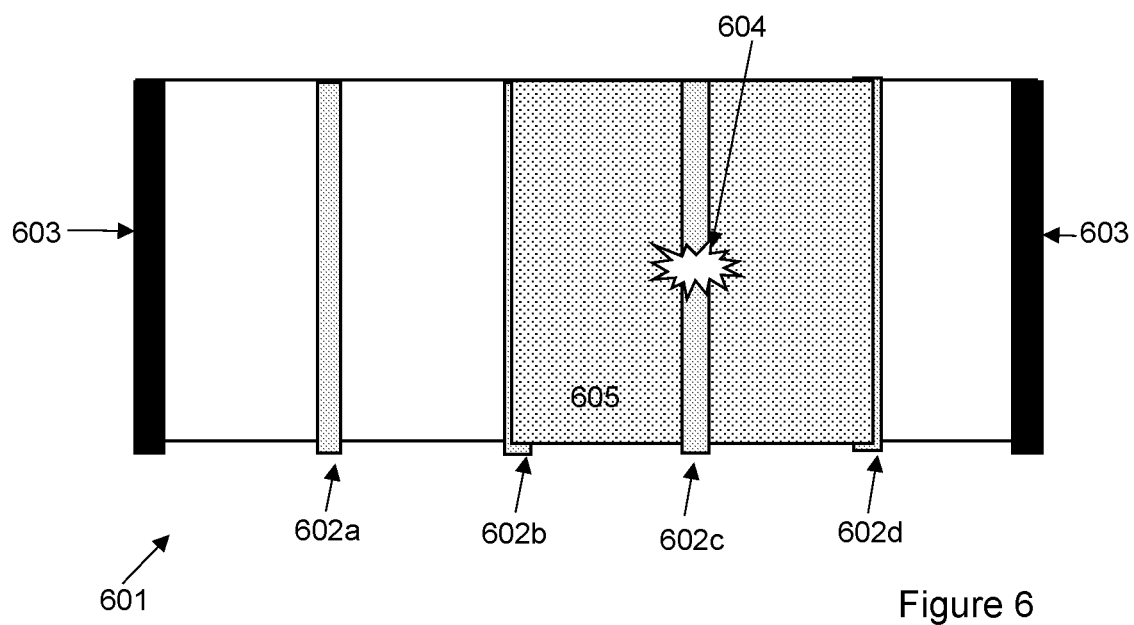
FIG. 6 shows a schematic of an Electro-Thermal Heating Element and a repair according to one or more of the embodiments of the present invention.

The principle of the invention is also applicable for situations where the damage covers or impacts a dummy busbar, as shown in FIG. 6. The ETH element 601 comprises 4 dummy busbars 602a to 602d which are spaced between to active busbars 603. An area of damage 604 occurs in the ETH element 601 which impacts upon the dummy busbar 602c along with a section of the ETH element 601. In this example, the two adjacent busbars will be dummy busbars 602b and 602d, and the process of repair follows that of the examples described in relation to FIGS. 3 to 5. Therefore, a new section of ETH element 605 replaces the section of damaged ETH element and new busbars may be used to make a connection to the two dummy busbars 602b and 602d. Additionally, the damaged busbar 602c may be replaced by a new dummy busbar by attaching the new dummy busbar to the new section of ETH element 605 at the same location as the damaged busbar 602c.

Figure 7:
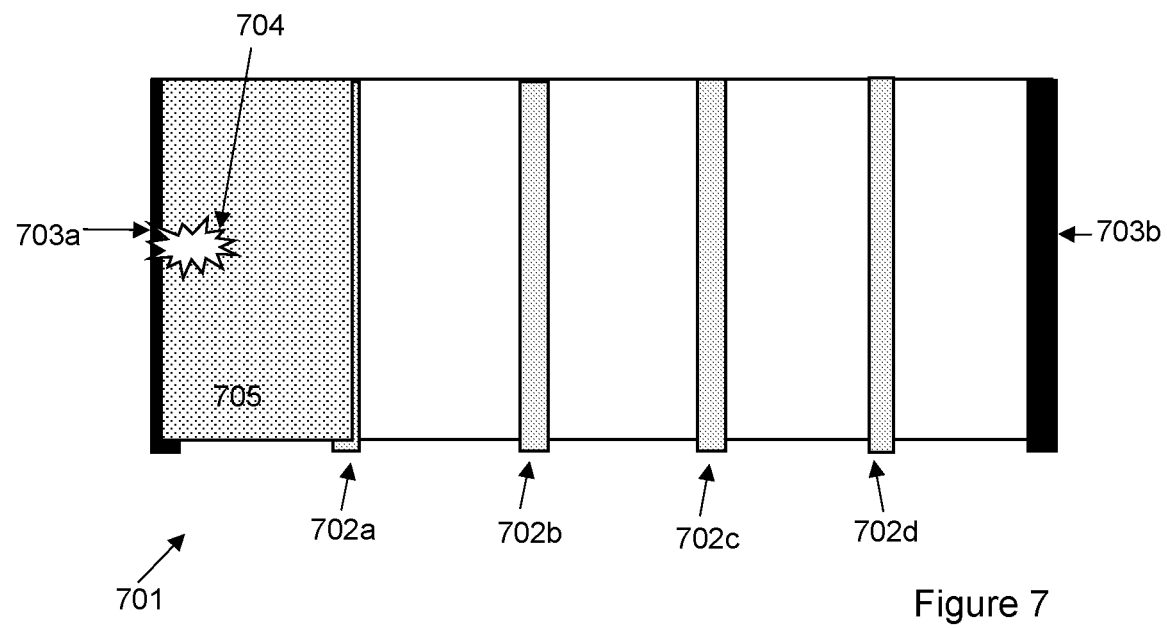
FIG. 7 shows a schematic of an Electro-Thermal Heating Element and a repair according to one or more of the embodiments of the present invention.

Similarly, if the area of damage impacts an active busbar then the same principles of the invention are applicable as shown in FIG. 7. The ETH element 701 comprises four dummy busbars 702a to 702d which are spaced between to active busbars 703a and 703b. An area of damage 704 occurs in the ETH element 701 which impacts upon the active busbar 703a along with a section of the ETH element 701. In this example, the two adjacent busbars will be the active busbar 703a and the dummy busbars 702a, and the process of repair follows that of the examples described in relation to FIGS. 3 to 5. Therefore, a new section of ETH element 705 replaces the section of damaged ETH element and a new busbar may be used to make a connection to the dummy busbars 702a. Additionally, the damaged active busbar 703a will be replaced by a new active busbar by attaching the new active busbar to the new section of ETH element 705 at the same location as the damaged active busbar 703a.

In all of the examples described hereinabove, once the new section of ETH element is attached to the existing ETH element then the removed areas of the blade structure are replaced with new materials.

In the above examples, there were four dummy busbars, however, as will be appreciated there may be any number of dummy busbars, e.g. 1, 2, 3, 4, 5, 6, 7, 8, 9, 10, 11, 12, 13, 14, 15, 16, 17, 18, 19, 20, and so on, positioned or located at predetermined positions and/or spacings on the ETH element. The number of dummy busbars is related to the design of the ETH element (e.g. the length of the ETH element) and the predetermined spacing for the dummy busbars on the ETH element.

The examples and embodiments described above are for example purposes only, and it will be appreciated that features of different embodiments or examples may be combined with one another. Embodiments of the present invention have been described, by way of example only, and many modifications or changes may be made to the embodiments and be within the scope of the apppended claims.

The invention claimed is:

1. An Electro-Thermal Heating element comprising:
an electrically conductive resistive material;
two active busbars for supplying electrical power to the electrically conductive resistive material; and
at least one dummy busbar at a predetermined spacing between the two active busbars on the electrically conductive resistive material, and wherein the at least one dummy busbar is spaced from both the two active busbars.

2. The Electro-Thermal Heating element according to claim 1, further comprising a new section of electrically conductive resistive material connected to a first dummy busbar and a further busbar, wherein the new section of electrically conductive resistive material replaces a damaged section of electrically conductive resistive material that is removed from the Electro-Thermal Heating element.

3. The Electro-Thermal Heating element according to claim 2, in which the further busbar is a second dummy busbar or one of the two active busbars.

4. The Electro-Thermal Heating element according to claim 2, further comprising at least one new busbar attached to one or both of the first dummy busbar and the further busbar.

5. A method of repairing an Electro-Thermal Heating element; the Electro-Thermal Heating element being embedded in laminate layers of a wind turbine blade structure, the method comprising:
an electrically conductive resistive material;
two active busbars for supplying electrical power to the electrically conductive resistive material; and
at least one dummy busbar at a predetermined spacing on the electrically conductive resistive material between the two active busbars; the method of repairing the Electro-Thermal Heating element comprising:
determining a location of damage to a section of electrically conductive resistive material;
determining a position of a first dummy busbar and a further busbar adjacent to the location of the damaged section of electrically conductive resistive material;
removing the laminate layers of the wind turbine blade structure at the location of the damaged section of electrically conductive resistive material between the adjacent busbars;
removing the damaged section of electrically conductive resistive material;
attaching a new section of electrically conductive resistive material wherein the new section of electrically conductive resistive material makes electrical contact with the adjacent busbars; and
replacing the laminate layers of the wind turbine blade structure over the new section of electrically conductive resistive material.

6. The method of repairing an Electro-Thermal Heating element according to claim 5, in which the further busbar is a second dummy busbar or one of the two active busbars.

7. The method of repairing an Electro-Thermal Heating element according to claim 5, further comprising attaching at least one new busbar to one or both of the first dummy busbar and the further busbar.

8. The Electro-Thermal Heating element according to claim 1, wherein the Electro-Thermal Heating element is embedded in laminate layers of a wind turbine blade structure.

9. The Electro-Thermal Heating element according to claim 1, wherein the at least one dummy busbar serves no electrical purpose during normal, non-damaged operation of the Electro-Thermal Heating element but is operable to make connection to a replacement electrically conductive resistive layer in the event of damage to the electrically conductive resistive material.

10. A wind turbine blade, comprising:
an Electro-Thermal Heating element, the Electro-Thermal Heating element comprising:
a first layer formed of an electrically conductive resistive material;
two active busbars positioned at opposite ends of the first layer and configured for supplying electrical power to the first layer;
a first busbar disposed on the first layer between the two active busbars, the first busbar is spaced from both the two active busbars; and
a second layer formed of an electrically conductive resistive material, the second layer is connected to the first busbar and either a second busbar spaced from the first busbar or one of the two active busbars so that the second layer is electrically coupled with the first layer.

11. The wind turbine blade of claim 10, wherein the second layer is spaced from the first layer by at least a thickness of the first busbar.

12. The wind turbine blade of claim 10, wherein the second layer is connected to the first busbar by a third busbar.

13. The wind turbine blade of claim 12, wherein the first busbar and the third busbar are in a stacked arrangement between the first layer and the second layer.

14. The wind turbine blade of claim 10, wherein the second layer is connected to the first busbar and the second busbar.

15. The wind turbine blade of claim 10, wherein the second layer is connected to the first busbar and one of the two active busbars.

16. The wind turbine blade of claim 10, wherein the Electro-Thermal Heating element further comprises:
a third busbar disposed on the first layer between the two active busbars, the third busbar is spaced from both the two active busbars and the first busbar, the second busbar is positioned between the first busbar and the third busbar, and
wherein the second layer connects to the first busbar and the third busbar.

17. The wind turbine blade of claim 16, wherein the Electro-Thermal Heating element further comprises:
a fourth bus bar disposed on a first side of the second layer opposite a second side of the second layer that faces toward the second busbar, and
wherein the fourth bus bar is disposed on the second layer at a same location as the second busbar.

18. The wind turbine blade of claim 10, wherein the Electro-Thermal Heating element has a length along a first direction and a width along a second direction, and wherein the second layer extends along the first direction between the first busbar and either the second busbar or one of the two active busbars and along the second direction the width of the Electro-Thermal Heating element.

19. The wind turbine blade of claim 10, wherein the Electro-Thermal Heating element has a length along a first direction and a width along a second direction, and wherein the second layer extends along the first direction between the first busbar and either the second busbar or one of the two active busbars and along the second direction only a portion of the width of the Electro-Thermal Heating element.

20. The wind turbine blade of claim 10, wherein the first busbar, the second busbar, and the two active busbars are arranged parallel to one another along a chordwise direction of the wind turbine blade.

* * * * *